US008728667B2

(12) United States Patent
Inagaki et al.

(10) Patent No.: US 8,728,667 B2
(45) Date of Patent: May 20, 2014

(54) ACTIVE MATERIAL FOR BATTERIES, NON-AQUEOUS ELECTROLYTE BATTERY, AND BATTERY PACK

(71) Applicant: Kabushiki Kaisha Toshiba, Minato-ku (JP)

(72) Inventors: Hiroki Inagaki, Kawasaki (JP); Keigo Hoshina, Yokohama (JP); Yasuhiro Harada, Yokohama (JP); Yuki Otani, Kawasaki (JP); Norio Takami, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 13/845,535

(22) Filed: Mar. 18, 2013

(65) Prior Publication Data

US 2013/0216868 A1    Aug. 22, 2013

Related U.S. Application Data

(60) Division of application No. 13/304,564, filed on Nov. 25, 2011, now Pat. No. 8,409,755, which is a continuation of application No. PCT/JP2009/059803, filed on May 28, 2009.

(51) Int. Cl.
*H01M 4/13*      (2010.01)
*H01M 4/02*      (2006.01)

(52) U.S. Cl.
USPC .................... 429/231.5; 429/209; 429/156

(58) Field of Classification Search
None
See application file for complete search history.

(56) References Cited

U.S. PATENT DOCUMENTS

2007/0292760 A1    12/2007  Patoux et al.
2009/0042095 A1*    2/2009  Inagaki et al. .................. 429/92

FOREIGN PATENT DOCUMENTS

| JP | 2007-234233 | 9/2007 |
| JP | 2008-034368 | 2/2008 |
| JP | 2008-117625 | 5/2008 |
| JP | 2008-124012 | 5/2008 |
| JP | 2008-255000 | 10/2008 |
| JP | 2009-043679 | 2/2009 |
| WO | WO 2009/028530 | 3/2009 |
| WO | WO 2009/028553 | 3/2009 |

OTHER PUBLICATIONS

International Search Report issued Sep. 8, 2009 in PCT/JP2009/059803 filed May 28, 2009.
René Marchand, et al.; "TiO$_2$(B) A New Form of Titanium Dioxide and the Potassium Octatitanate K$_2$Ti$_8$O$_{17}$"; Mat. Res. Bull., 1980, vol. 15, No. 8, pp. 1129-1133.
English translation of International Preliminary Report on Patentability and Written Opinion of the International Searching Authority issued Dec. 12, 2011 in PCT/JP2009/059803, filed May 28, 2009.

* cited by examiner

*Primary Examiner* — Barbara Gilliam
*Assistant Examiner* — Angela Martin
(74) *Attorney, Agent, or Firm* — Oblon, Spivak, McClelland, Maier & Neustadt, L.L.P.

(57) ABSTRACT

According to one embodiment, an active material for batteries includes monoclinic β-type titanium composite oxide containing at least one element selected from the group consisting of V, Nb, Ta, Al, Ga, and In, the at least one element being contained in an amount of 0.03 wt % or more and 3 wt % or less.

11 Claims, 5 Drawing Sheets

FIG. 6

ACTIVE MATERIAL FOR BATTERIES, NON-AQUEOUS ELECTROLYTE BATTERY, AND BATTERY PACK

CROSS REFERENCE TO RELATED APPLICATIONS

This application is a Divisional application of U.S. Ser. No. 13/304,564, filed Nov. 25, 2011, which is a Continuation Application of PCT Application No. PCT/JP2009/059803, filed May 28, 2009; the entirety of their contents being incorporated herein by reference.

FIELD

Embodiments described herein relate generally to a active material for batteries, a non-aqueous electrolyte battery, and a battery pack.

BACKGROUND

Titanium oxide having a monoclinic β-type structure (hereinafter referred to as $TiO_2$ (B)) has recently been noted as an active material for a non-aqueous electrolyte battery (see JP-A 2008-34368 (KOKAI), JP-A 2008-117625 (KOKAI) and WO 2009/028553 A1). The number of lithium ions which can be inserted and released per unit chemical formula of spinel type lithium titanate ($Li_4Ti_5O_{12}$) which has heretofore been put into practical use is three. Therefore, the number of lithium ions which can be inserted/released per titanium ion is 3/5, i.e., the theoretical maximum number is 0.6. In contrast, in $TiO_2(B)$, the maximum number of lithium ions which can be inserted/released per titanium ion is 1.0. Therefore, $TiO_2(B)$ has a theoretical capacity of about 335 mAh/g which is an excellent property.

DETAILED DESCRIPTION

Hereinafter, the active material for batteries, a non-aqueous electrolyte battery, and battery pack according to the embodiments are described below with reference to drawings.

In general, according to an embodiment, an active material for batteries comprises monoclinic β-type titanium composite oxide containing at least one element selected from the group consisting of V, Nb, Ta, Al, Ga, and In, the at least one element being contained in an amount of 0.03 wt % or more and 3 wt % or less.

It is possible to measure the content of the at least one element selected from the group consisting of V, Nb, Ta, Al, Ga, and In by ICP emission spectroscopy. The measurement of the content of the element by the ICP emission spectroscopy is conducted by the following method, for example. A battery is disassembled in a discharge state, and an electrode (e.g., a negative electrode) is taken out, followed by deactivation of a negative electrode layer in water. After that, titanium composite oxide in the negative electrode layer is extracted. The extraction treatment may be performed by eliminating a conductive agent and a binder in the negative electrode layer by a heat treatment in air, for example. After transferring the extracted titanium composite oxide to a container while measuring the titanium composite oxide, acid fusion or alkali fusion is performed to obtain a measurement solution. ICP emission spectroscopy of the measurement solution is conducted by using a measurement apparatus (e.g., SPS-1500V manufactured by SII Nanotechnology Inc.) to measure a content of the element.

Figure 6:
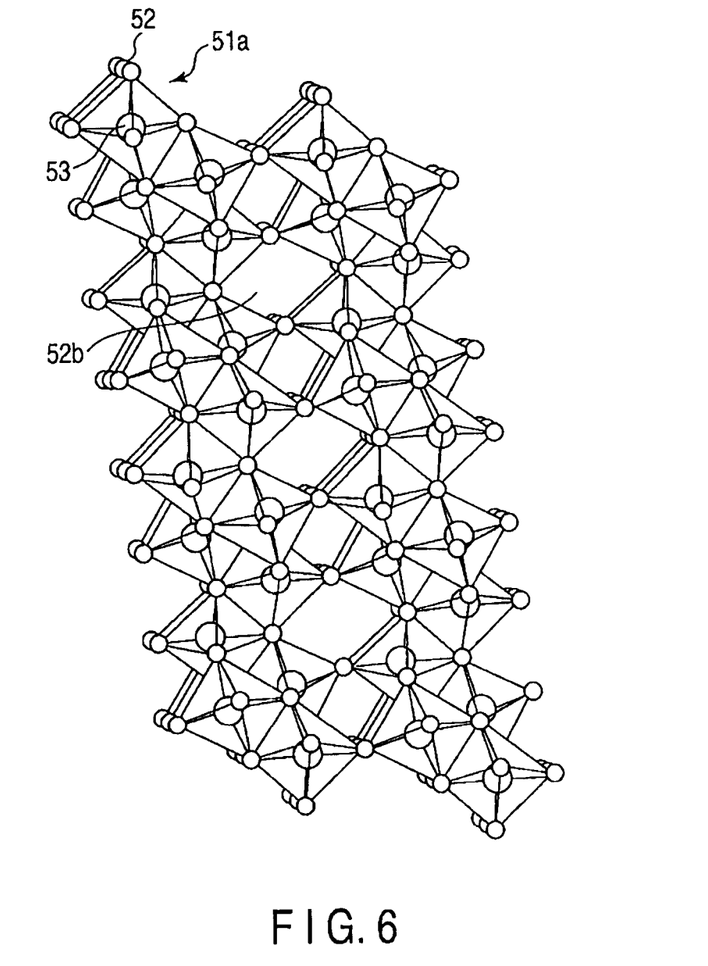
FIG. 6 is a diagram schematically showing a crystal structure of monoclinic β-type titanium oxide ($TiO_2(B)$).

A structure of the monoclinic titanium dioxide is indicated as $TiO_2(B)$. The crystal structure indicated as $TiO_2(B)$ primarily belongs to the space group C2/m and has a tunneling structure as shown in FIG. 6. Detailed crystal structure of $TiO_2(B)$ can be found in the documents of R. Marchang, L. Brohan, and M. Tournoux; Material Research.

As shown in FIG. 6, in the crystal structure indicated as $TiO_2(B)$, a titanium ion 53 and oxide ions 52 form a skeletal structure part 51a, and the skeletal structure parts 51a are alternately disposed. A clearance part 51b is formed between the adjacent skeletal structure parts 51a. The clearance part 51b can be a host site for intercalation (insertion) of a foreign atom. It has been known that a host site which is capable of insertion/release of a foreign atom exist on a crystal surface of $TiO_2(B)$. When lithium ions are inserted into or released from the host sites, $TiO_2(B)$ inserts and releases the lithium ions in a reversible manner.

When the lithium ion is inserted into the clearance part 51b, $Ti^{4+}$ forming the skeleton is reduced to $Ti^{3+}$, so that electrical neutrality of the crystal is maintained. Since $TiO_2(B)$ has one $Ti^{4+}$ per chemical formula, it is possible to insert between layers one lithium ion at the maximum in theory. Therefore, a titanium oxide compound having the $TiO_2(B)$ crystal structure is represented by a general formula $Li_xTiO_2$ ($0 \le x \le 1$). In this case, it is possible to obtain a theoretical capacity of 335 mAh/g, which is almost twice of titanium dioxide described in JP-A 2008-34368 (KOKAI) and JP-A 2008-117625 (KOKAI).

However, since the above-described $TiO_2(B)$ is an insulator, it is difficult to fully exploit its high capacity. Further, high current characteristics of a non-aqueous electrolyte battery containing such $TiO_2(B)$ as an active material are degraded.

In view of the above, the embodiment enables to improve an electron conduction property of $TiO_2(B)$ by adding a predetermined amount of at least one element selected from the group of V, Nb, Ta, Al, Ga, and In to the monoclinic β-type titanium oxide ($TiO_2(B)$). Therefore, it is possible to fully exploit the high capacity property of $TiO_2(B)$, thereby making it possible to obtain a active material for batteries which contributes to high current characteristics and an excellent charge-discharge cycle property when incorporated into a battery.

For the at least one element selected from the group consisting of V, Nb, Ta, Al, Ga, and In, Nb is preferred. It is preferable to use Nb and V or Nb and Ta in the case of using two or more species of the elements or to use three species of Nb, V, and Ta of the elements.

When the content of the at least one element is less than 0.03 wt %, it is difficult to attain the improvement in electron conduction property and an effect of stabilizing crystal structure of $TiO_2(B)$. On the other hand, the content of the at least one element exceeds 3 wt %, a different phase appears in TiO$_2$(B), thereby raising a risk of deteriorating electric capacity and charge-discharge cycle property. The at least one element is more preferably contained in an amount 0.03 to 1 wt % in the sum of the titanium composite oxide and the at least one element.

TiO$_2$(B) contained the at least one element may preferably have a primary particle diameter of 100 nm or more and 1 μm or less. If the primary particle diameter is 100 nm or more, handling is facilitated in terms of industrial production. On the other hand, if the primary particle diameter is 1 μm or less, it is possible to smoothly diffuse lithium ions into a solid of TiO$_2$(B).

TiO$_2$(B) contained the at least one element may preferably have a specific surface area of 5 m$^2$/g or more and 50 m$^2$/g or less. When the specific surface area is 5 m$^2$/g or more, it is possible to ensure sufficient insertion/desorption sites for lithium ions. On the other hand, the specific surface area is 50 m$^2$/g or less, handling is facilitated in terms of industrial production.

Hereinafter, a production process for the active material for batteries according to the embodiment will be described.

To start with, a starting material is prepared, which is obtainable by adding a predetermined amount of at least one element selected from the group consisting of V, Nb, Ta, Al, Ga, and In to an alkali titanate compound such as Na$_2$Ti$_3$O$_7$, K$_2$Ti$_4$O$_9$, and Cs$_2$Ti$_5$O$_{12}$. It is possible to synthesize potassium titanate (K$_2$Ti$_4$O$_9$) by a flux method, for example. It is possible to synthesize the alkali titanate compound containing the at least one element by mixing a material containing as a constituent element the at least one element selected from the group consisting of V, Nb, Ta, Al, Ga, and In, a material containing Ti, and a material containing an alkali element such as Na, K, and Cs at predetermined ratios and by employing an ordinary solid phase reaction. A method and a crystal shape in the synthesis of the starting material are not limited.

The starting material is washed well with pure water to eliminate impurities from the alkali titanate compound, and then an acid treatment is performed to exchange alkali cations with protons. It is possible to perform the exchange with protons of sodium ions, potassium ions, and cesium ions contained in sodium titanate, potassium titanate, and cesium titanate without breaking the crystal structures. The proton exchange by acid treatment is performed by adding hydrochloric acid having a concentration of 1M to the starting material, followed by stirring. It is desirable to perform the acid treatment until the proton exchange is satisfactorily completed. A pH may be adjusted during the proton exchange by adding an alkalizing solution to the solution. After the proton exchange, washing with pure water is performed again.

Before performing the proton exchange, it is preferable to pulverize the starting material by using a ball mill. The pulverization enables the proton exchange to be smoothly performed. As pulverization conditions, a zirconia ball having a diameter of 10 to 15 mm is used per 100 cm$^2$ of a container, and the zirconia ball is rotated at a rotation speed of 600 to 1000 rpm for about 1 to 3 hours. Pulverization for one hour or less is not preferred since the starting material is not satisfactorily pulverized by such pulverization. Further, long-time pulverization of 3 hours or more is not preferred since a mechanochemical reaction is promoted by such pulverization to cause a phase separation into a compound different from the target product.

By washing and drying a product obtained after the completion of proton exchange, a proton exchange product which is an intermediate product is obtained. Subsequently, TiO$_2$(B) (final product) containing the at least one element selected from the group consisting of V, Nb, Ta, Al, Ga, and In is produced by subjecting the proton exchange product to a heat treatment.

A preferred heating temperature is from 250 to 500° C. When the heating temperature is less than 250° C., crystallinity is considerably deteriorated to deteriorate electrode capacity, charge-discharge efficiency, and repetition property. On the other hand, when the heating temperature exceeds 500° C., an impurity phase such as an anatase phase is generated to raise a risk of a reduction of capacity. A more preferred heating temperature is 300 to 400° C.

It is possible to use the active material for batteries according to the embodiment not only for a negative electrode which will be described later in this specification but also for a positive electrode, and high current characteristics are attained in either use. More specifically, the high current characteristics are the effect attained by containing the at least one element selected from the group consisting of V, Nb, Ta, Al, Ga, and In, and the effect attained in the use for the positive electrode is not different from that attained in the use for the negative electrode. Therefore, it is possible to use the active material for batteries according to the embodiment for either of the negative electrode or the positive electrode and to attain the same effect.

In the case of using the active material for batteries according to the embodiment for the positive electrode, an active material of the negative electrode as the counter electrode may be metal lithium, a lithium alloy, or a carbon-based material such as graphite and coke.

Hereinafter, a non-aqueous electrolyte battery according to the embodiment will be described.

The non-aqueous electrolyte battery according to the embodiment includes a outer case; a positive electrode housed in the outer case; a negative electrode housed in the outer case so as to spatially separate by a separator, for example, from the positive electrode and comprising an active material; and a non-aqueous electrolyte contained in the outer case. The active material of the negative electrode comprises monoclinic β-type titanium composite oxide containing at least one element selected from the group consisting of V, Nb, Ta, Al, Ga, and In. The at least one element is contained in an amount of 0.03 wt % or more and 3 wt % or less.

Hereinafter, the outer case, negative electrode, positive electrode, separator, and non-aqueous electrolyte which are the constituent members of the non-aqueous electrolyte battery will be described in detail.

1) Outer Case

The outer case is formed from a laminated film having a thickness of 0.5 mm or less. Further, a metallic container having a thickness of 1.0 mm or less is used for the outer case. The metallic container may more preferably have a thickness of 0.5 mm or less.

Examples of a shape of the outer case include a flat type (thin type), a square type, a cylinder type, a coin type, a button type, and the like. Examples of the outer case include a outer case for a small battery which is mounted to a mobile electronic appliance and a outer case for a large battery which is mounted to a two-wheel or four-wheel automobile.

As the laminated film, a multilayer film in which a metal layer is formed between resin layers is used. The metal layer may preferably be an aluminum foil or an aluminum alloy foil for attaining a light weight. As the resin layer, a polymer material such as polypropylene (PP), polyethylene (PE), nylon, polyethylene terephthalate (PET), and the like may be used. The laminated film may be molded into the shape of the outer case by sealing by thermal fusion bonding.

The metallic container is made from aluminum, an aluminum alloy, or the like. The aluminum alloy may preferably be an alloy containing an element such as magnesium, zinc, silicon, and the like. In the case where a transition metal such as iron, copper, nickel, chrome, and the like is contained in the alloy, an amount of the transition metal may preferably be 100 wt ppm or less.

2) Negative Electrode

The negative electrode includes a current collector and a negative electrode layer formed on one or both of surfaces of the current collector and containing an active material, a conductive agent and a binder.

As the active material, the above-described active material for batteries comprising the monoclinic β-type titanium composite oxide containing at least one element selected from the group consisting of V. Nb, Ta, Al, Ga, and In may be used. The at least one element is contained in an amount of 0.03 wt % or more and 3 wt % or less.

In the embodiment, the non-aqueous electrolyte battery in which the negative electrode including the negative electrode layer comprising the active material is incorporated is capable of improving high characteristics and charge-discharge cycle property.

The conductive agent enhances a power collecting property of the active material and suppresses contact resistance with the current collector. Examples of the conductive agent include acetylene black, carbon black, and black lead.

The binder is capable of binding the active material with the conductive agent. Examples of the binder include polytetrafluoroethylene (PTFE), polyvinylidene fluoride (PVdF), a fluorine-based rubber, and a styrene butadiene rubber.

The active material, the conductive agent, and the binder in the negative electrode layer may preferably be contained at ratios of 70 wt % or more and 96 wt % or less, 2 wt % or more and 28 wt % or less, and 2 wt % or more and 28 wt % or less. When the amount of the conductive agent is less than 2 wt %, the power collecting property of the negative electrode layer is deteriorated to raise a risk of deterioration of high current characteristics of the non-aqueous electrolyte battery. Further, when the amount of the binder is less than 2 wt %, a binding property between the negative electrode layer and the current collector are deteriorated to raise a risk of deterioration of the cycle property. On the other hand, it is preferable to keep each of the amounts of the conductive agent and the binder to 28 wt % or less in order to attain high capacity.

The current collector may preferably be an aluminum foil or an aluminum alloy foil containing an element such as Mg, Ti, Zn, Mn, Fe, Cu, and Si. The aluminum foil and the aluminum alloy foil are electrochemically stable within a potential range which is nobler than 1.0 V vs Li/Li$^+$.

The negative electrode is produced by preparing a slurry by suspending the active material, the conductive agent, and the binder into a general-purpose solvent, coating the slurry on the current collector, drying, and pressing, for example. Alternatively, the negative electrode may be prepared by forming the active material, conductive agent and binder into pellets to form a negative electrode layer, and forming the negative electrode layer on the current collector.

3) Positive Electrode

The positive electrode includes a current collector, and a positive electrode layer(s) formed on one surface or both surfaces of the current collector and comprising an active material, a conductive agent and a binder.

As the active material, an oxide, a polymer, or the like may be used, for example.

As the oxide, manganese dioxide ($MnO_2$), iron oxide, copper oxide, and nickel oxide, in each of which lithium is occluded as well as lithium manganese composite oxide (e.g., $Li_xMn_2O_4$ and $Li_xMnO_2$), lithium nickel composite oxide (e.g., $Li_xNiO_2$), lithium cobalt composite oxide ($Li_xCoO_2$), lithium nickel cobalt composite oxide (e.g., $LiNi_{1-y}Co_yO_2$), lithium manganese cobalt composite oxide (e.g., $Li_xMn_yCo_{1-y}O_2$), spinel type lithium manganese nickel composite oxide (e.g., $Li_xMn_{2-y}Ni_yO_4$), lithium phosphor oxide having an olipine structure (e.g., $Li_xFePO_4$, $Li_xFe_{1-y}Mn_yPO_4$, $Li_xCoPO_4$), iron sulfate ($Fe_2(SO_4)_3$), and vanadium oxide ($V_2O_5$) are usable. Here, x and y may preferably be $0<x\leq1$ and $0\leq y\leq1$.

As the polymer, a conductive polymer material such as polyaniline and polypyrrole or a disulfide-based polymer material may be used. Sulfur (S) and carbon fluoride are also usable for the active material.

Examples of a preferred active material include lithium manganese composite oxide ($Li_xMn_2O_4$), lithium nickel composite oxide ($Li_xNiO_2$), lithium cobalt composite oxide ($Li_xCoO_2$), lithium nickel cobalt composite oxide ($LiNi_{1-y}Co_yO_2$), spinel type lithium manganese nickel composite oxide ($Li_xMn_{2-y}Ni_yO_4$), lithium manganese cobalt composite oxide ($Li_xMn_yCo_{1-y}O_2$), and lithium iron phosphate ($Li_xFePO_4$), each of which has a high positive electrode voltage. Here, x and y may preferably be $0<x\leq1$ and $0\leq y\leq1$.

A more preferred active material is lithium cobalt composite oxide or lithium manganese composite oxide. Since these active materials have high ion conduction property, diffusion of lithium ions in the positive electrode active material hardly progresses to a rate-controlling step in the combination with the above-described negative electrode active material. Therefore, the active materials are excellent in compatibility with the lithium titanium composite oxide in the negative electrode active material.

The conductive agent enhances a power collecting property of the active material and suppresses contact resistance with the current collector. Examples of the conductive agent include a carbonaceous substance such as acetylene black, carbon black, and black lead.

The binder is capable of binding the active material with the conductive agent. Examples of the binder include polytetrafluoroethylene (PTFE), polyvinylidene fluoride (PVdF), and a fluorine-based rubber.

The active material, the conductive agent, and the binder in the positive electrode layer may preferably be contained at ratios of 80 wt % or more and 95 wt % or less, 3 wt % or more and 18 wt % or less, and 2 wt % or more and 17 wt % or less. The conductive agent exhibits the above-described effect when the amount thereof is 3 wt % or more. The conductive agent suppresses decomposition of the non-aqueous electrolyte on surfaces of the conductive agent under high temperature storage when the amount thereof is 18 wt % or less. The binder enables to attain satisfactory positive electrode strength when the amount thereof is 2 wt % or more. The binder reduces the content of a binder which is an insulating material in the positive electrode and reduces internal resistance when the amount thereof is 17 wt % or less.

The current collector may preferably be an aluminum foil or an aluminum alloy foil containing an element such as Mg, Ti, Zn, Mn, Fe, Cu, and Si.

The positive electrode is produced by preparing a slurry by suspending the active material, the conductive agent, and the binder into a general-purpose solvent, coating the slurry on the current collector, drying, and pressing, for example. Alternatively, the positive electrode may be prepared by forming the active material, conductive agent and binder into pellets to form a positive electrode layer, and forming the negative electrode layer on the current collector.

4) Non-Aqueous Electrolyte

Examples of the non-aqueous electrolyte include a liquid non-aqueous electrolyte which is prepared by dissolving an electrolyte, for example, into an organic solvent and a gel non-aqueous electrolyte which is a composite of a liquid electrolyte and a polymer material.

The liquid non-aqueous electrolyte may preferably be obtained by dissolving an electrolyte into the organic acid at a concentration of 0.5 M or more and 2.5 M or less.

Examples of the electrolyte include lithium salts of lithium perchlorate ($LiClO_4$), lithium hexafluorophosphate ($LiPF_6$), lithium tetrafluoroborate ($LiBF_4$), lithium hexafluoro arsenate ($LiAsF_6$), lithium trifluoromethasulfonate ($LiCF_3SO_3$), and bistrifluoromethylsulfonyl imitritium [$LiN(CF_3SO_2)_2$] and mixtures thereof. The electrolyte may preferably be hardly-oxidized even in high potential, and $LiPF_6$ is most preferred.

Examples of the organic solvent include a cyclic carbonate such as propylene carbonate (PC), ethylene carbonate (EC), and vinylene carbonate; a chain carbonate such as diethyl carbonate (DEC), dimethyl carbonate (DMC), and methylethyl carbonate (MEC); a cyclic ether such as tetrahydrofuran (THF), 2-methyl tetrahydrofuran (2MeTHF), and dioxolan (DOX); a chain ether such as dimethoxyethane (DME) and diethoxy ethane (DEE); γ-butyrolactone (GBL); acetonitrile (AN); and sulfolane (SL). The organic solvents may be used alone or in the form of a mixture solvent.

Examples of the polymer material include polyvinylidene fluoride (PVdF), polyacrylonitrile (PAN), and polyethylene oxide (PEO).

The organic solvent may preferably be the mixture solvent obtained by mixing at least two organic solvents selected from the group consisting of propylene carbonate (PC), ethylene carbonate (EC), and (diethyl carbonate [DEC]) or the mixture solvent containing γ-butyrolactone (GBL).

5) Separator

Examples of the separator include a porous film containing polyethylene, polypropylene, batteryulose, or polyvinylidene fluoride (PVdF) and a nonwoven fabric of a synthetic resin. The porous film may preferably be made from polyethylene or polypropylene, which improves safety due to its capability of being molten at a certain temperature and of blocking a current.

Figure 1:
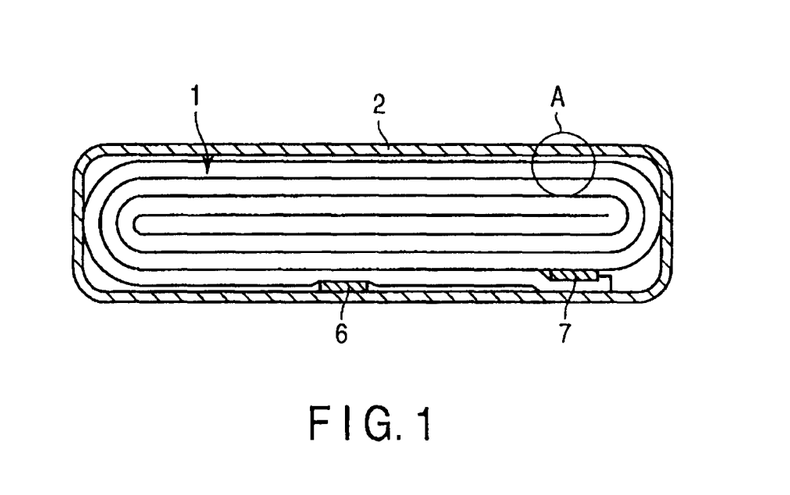
FIG. 1 is a sectional view showing a flat non-aqueous electrolyte battery according to one embodiment.
Figure 2:
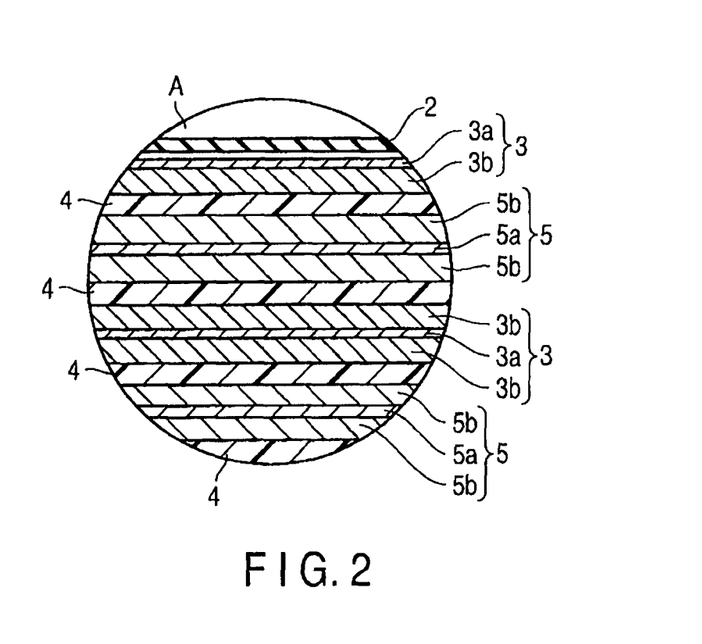
FIG. 2 is an enlarged sectional view showing a part A of FIG. 1.

Hereinafter, a non-aqueous electrolyte battery according to the embodiment (e.g., a flat non-aqueous electrolyte battery in which the outer case is made from a laminated film) will be described in more details with reference to FIG. 1 and FIG. 2. FIG. 1 is a sectional view showing a thin non-aqueous electrolyte battery, and FIG. 2 is an enlarged view of a part A of FIG. 1. Further, the diagrams are not more than those which are schematically drawn for the purpose of illustration and understanding of the invention. Shapes, dimensions, ratios, and the like in the diagrams may partially be different from actual devices, and designs thereof can be appropriately be changed by taking the following description and well-known technologies into consideration.

A flat, spiral electrode group 1 is housed in a sac-like outer case 2 made from a laminated film which is obtained by inserting an aluminum foil into two resin layers. The flat, spiral electrode group 1 is formed by spirally winding a laminate obtained by laminating a negative electrode 3, a separator 4, a positive electrode 5, and a separator 4 in this order from the outermost member and press-molding. The negative electrode 3 which serves as an outermost shell has a structure that a negative electrode layer 3b is formed on an inner surface of a negative electrode current collector 3a as shown in FIG. 2. The rest of the negative electrodes 3 have a structure that the negative electrode layer 3b is formed on both surfaces of the current collector 3a. An active material in the negative electrode layer 3b comprises monoclinic β-type titanium composite oxide containing at least one element selected from the group consisting of V, Nb, Ta, Al, Ga, and In, the at least one element being contained in an amount of 0.03 wt % or more and 3 wt % or less. The positive electrode 5 has a structure that a positive electrode layer 3b is formed on both surfaces of a current collector 5a.

In the vicinity of an outer periphery of the flat, spiral electrode group 1, a negative electrode terminal 6 is connected to the negative electrode current collector 3a of the negative electrode 3 serving as the outermost shell, and a positive electrode terminal 7 is connected to the positive electrode current collector 5a of the inner positive electrode 5. The negative electrode terminal 6 and the positive electrode terminal 7 are extended from an opening of the sac-like outer case 2 to the outside. For example, the liquid non-aqueous electrolyte is injected through the opening of the sac-like outer case 2. The flat, spiral electrode group 1 and the liquid non-aqueous electrolyte are completely sealed by heat-sealing the opening of the sac-like outer case 2 with the negative electrode terminal 6 and the positive electrode terminal 7 being inserted into the opening.

For the negative electrode terminal, a material which has electrical stability and conductivity when a potential is within a range of from 1.0 to 3.0 V vs $Li/Li^+$ may be used. Specific examples thereof include aluminum or an aluminum alloy containing an element such as Mg, Ti, Zn, Mn, Fe, Cu, and Si. The negative electrode terminal may preferably be a material which is the same as that used for the negative electrode current collector in order to reduce a contact resistance with the negative electrode current collector.

For the positive electrode terminal, a material which has electrical stability and conductivity when a potential is within a range of from 3.0 to 4.25 V vs $Li/Li^+$ may be used. Specific examples thereof include aluminum or an aluminum alloy containing an element such as Mg, Ti, Zn, Mn, Fe, Cu, and Si. The positive electrode terminal may preferably be a material which is the same as that used for the positive electrode current collector in order to reduce a contact resistance with the positive electrode current collector.

Hereinafter, a battery pack according to the embodiment will be described in detail.

The battery pack according to the embodiment has a plurality of the above-described non-aqueous electrolyte batteries (electric batteries), in which the electric batteries are connected and disposed in series, in parallel, or in series and in parallel.

The battery pack has an excellent cycle property.

More specifically, the above-described non-aqueous electrolyte battery according to the embodiment includes the negative electrode containing the monoclinic β-type titanium oxide containing at least one element selected from the group consisting of V, Nb, Ta, Al, Ga, and In and is capable of improving the high current characteristics and the charge-discharge cycle property while exploiting the high capacity of the monoclinic β-type titanium oxide. As a result, the battery pack obtained by incorporating a plurality of the batteries is capable of improving the charge-discharge cycle property.

Hereinafter, the battery pack according to the embodiment will specifically be described with reference to FIG. 3 and FIG. 4. As the battery, the flat non-aqueous electrolyte battery shown in FIG. 1 is used.

A plurality of batteries 21 form an assembled battery 23, in which the batteries 21 are layered in such a manner that the negative electrode terminal 6 and the positive electrode terminal 7 extended to the outside are oriented to an identical direction and fastened by an adhesive tape 22. The batteries 21 are connected in series as shown in FIG. 4.

A printed wiring board 24 is opposed to a lateral surface of the electric battery 21 in which the negative electrode terminal 6 and the positive electrode terminal 7 is extended. As shown in FIG. 4, a thermistor 25, a protection circuit 26, and a communication terminal 27 for communication with an external appliance are mounted on the printed wiring board 24. An insulating plate (not shown) is attached to a surface of the protection circuit board 24 which is opposed to the assembled battery 23 in order to avoid unnecessary connection with wirings of the assembled battery 23.

A positive electrode lead 28 is connected to the positive electrode terminal 7 positioned at the lowermost layer of the assembled battery 23, and a leading end thereof is inserted into a positive electrode connector 29 of the printed wiring board 24 for electric connection. A negative electrode lead 30 is connected to the negative electrode terminal 6 positioned at the uppermost layer of the assembled battery 23, and a leading end thereof is inserted into a negative electrode connector 31 of the printed wiring board 24 for electric connection. The connectors 29, 31 are connected to the protection circuit 26 through wirings 32, 33 formed on the printed wiring board 24.

The thermistor 25 is used for detecting a temperature of the electric battery 21, and a detection signal thereof is sent to the protection circuit 26. The protection circuit 26 can block a plus wiring 34a and a minus wiring 34b between the protection circuit 26 and the communication terminal 27 for communication with external appliance under a predetermined condition. The predetermined condition may be the detection temperature of the thermistor 25 which is equal to or a higher than a predetermined temperature, for example. Alternatively, the predetermined condition may be a detection of excessive charge, excessive discharge, excessive current, or the like of the electric battery 21. The detection of excessive charge is performed on each of the electric batteries 21 or all of the electric batteries 21. In the case of performing the detection on each of the electric batteries 21, a battery voltage may be detected, or a positive potential or a negative potential may be detected. In the latter case, a lithium electrode to be used as a reference electrode is inserted into each of the electric batteries 21. In the case of FIG. 3 and FIG. 4, a wiring 35 for voltage detection is connected to each of the electric batteries 21, and a detection signal is sent to the protection circuit 26 through the wiring 35.

A protection sheet 36 made from a rubber or a resin is disposed on each of three surfaces of the assembled battery 23 except for the lateral surface from which the positive electrode terminal 7 and the negative electrode terminal 6 are projected.

The assembled battery 23 is housed in a housing container 37 together with the protection sheets 36 and the printed wiring board 24. More specifically, the protection sheets 36 are disposed on inner surfaces in a longitudinal direction of the housing container 37 and an inner surface in a width direction, and the printed wiring board 24 is disposed on an inner surface in the width direction at an opposite side. The assembled battery 23 is position in a space enclosed by the protection sheets 36 and the printed wiring board 24. A cover 38 is attached to an upper surface of the housing container 37.

A heat-shrinkable tape may be used for fixing the assembled battery 23 in place of the adhesive tape 22. In this case, the protection sheets are disposed on both sides of the assembled battery, and the heat-shrinkable tape is put around the assembled battery 23, followed by heat shrinkage of the heat-shrinkable tape for bundling the electric battery.

Figure 3:
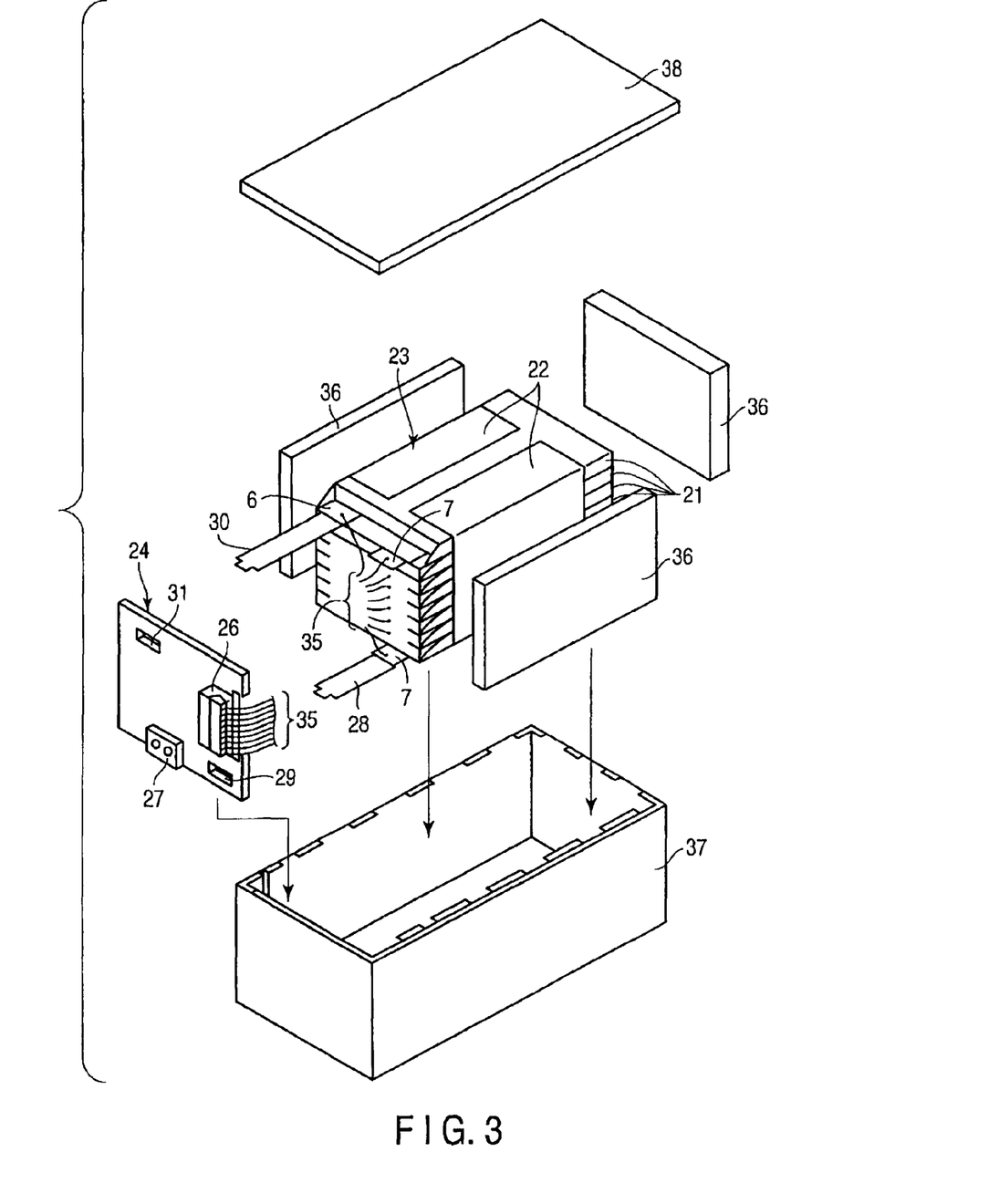
FIG. 3 is an exploded perspective view showing a battery pack according to the embodiment.
Figure 4:
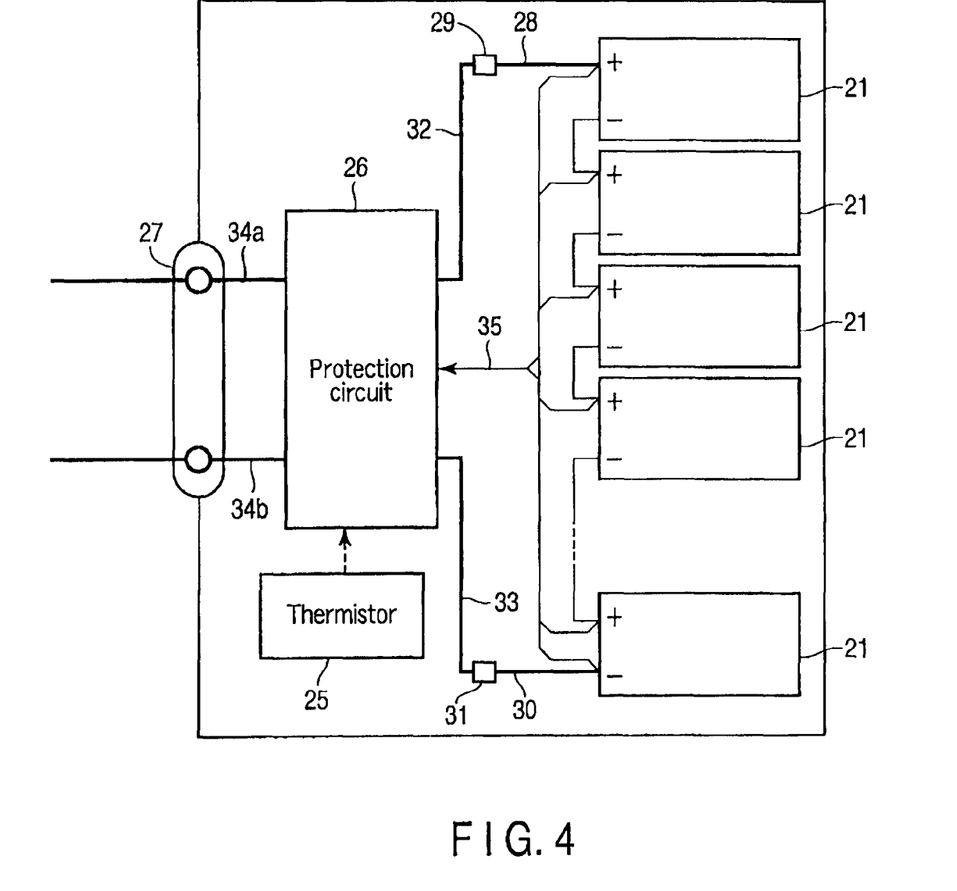
FIG. 4 is a block diagram showing the battery pack of FIG. 3.

Though the example of series connection of the electric batteries 21 is shown in FIG. 3 and FIG. 4, parallel connection or connection in which series connection and parallel connection are combined may be employed in order to increase a battery capacity. It is possible to connect the assembled battery packs in series or in parallel.

Further, the aspect of the battery pack may appropriately be changed depending on application. The application of the battery pack may preferably include those applications in which the excellent cycle property is exhibited when a high current is drawn. Specific examples include application as a power source of a digital camera and application to a vehicle such as a two- or four-wheeled hybrid electric vehicle, a two- or four-wheeled electric vehicle, and a power-assisted bicycle. The application to a vehicle is particularly suitable.

As described above, it is possible to obtain the non-aqueous electrolyte battery having the excellent high temperature property by using the mixture solvent obtained by mixing at least two solvents selected from the group consisting of propylene carbonate (PC), ethylene carbonate (EC), and diethyl carbonate (DEC) or the non-aqueous electrolyte containing γ-butyrolactone (GBL). The battery pack including a plurality of the non-aqueous electrolyte batteries is particularly suitable for use in vehicles.

Hereinafter, examples of the embodiment will be described. However, the embodiment is not limited to the examples described below insofar as the embodiment does not deviate from the scope of the present invention.

Example 1

Manufacture of Positive Electrode

To start with, a slurry was obtained by adding 90 wt % of a lithium nickel composite oxide ($LiNi_{0.82}Cu_{0.15}Al_{0.03}O_2$) powder, 5 wt % of acetylene black as a conductive agent, and 5 wt % of polyvinylidene fluoride (PVdF) to N-methylpyrrolidone (NMP) and mixing, and the slurry was applied on both surfaces of a current collector made from an aluminum foil having a thickness of 15 μm, followed by drying and pressing, thereby manufacturing a positive electrode having an electrode density of 3.15 g/cm³.

<Manufacture of Titanium Composite Oxide>

To start with, niobium oxide ($Nb_2O_5$), potassium carbonate ($K_2CO_3$), and anatase type titanium oxide ($TiO_2$) were mixed, followed by baking at 1000° C. for 24 hours to obtained $K_2Ti_4O_9$ including Nb. The obtained $K_2Ti_4O_9$ was subjected to particle size adjustment by dry pulverization using zirconia balls and then washed with pure water to obtain a proton exchange precursor. The obtained proton exchange precursor was thrown into a 1M hydrochloric acid solution, followed by stirring under an environment of 25° C. for 12 hours, thereby obtaining a proton exchange product.

A titanium composite oxide was produced by baking the obtained proton exchange product in air at 350° C. for 3 hours.

Figure 5:
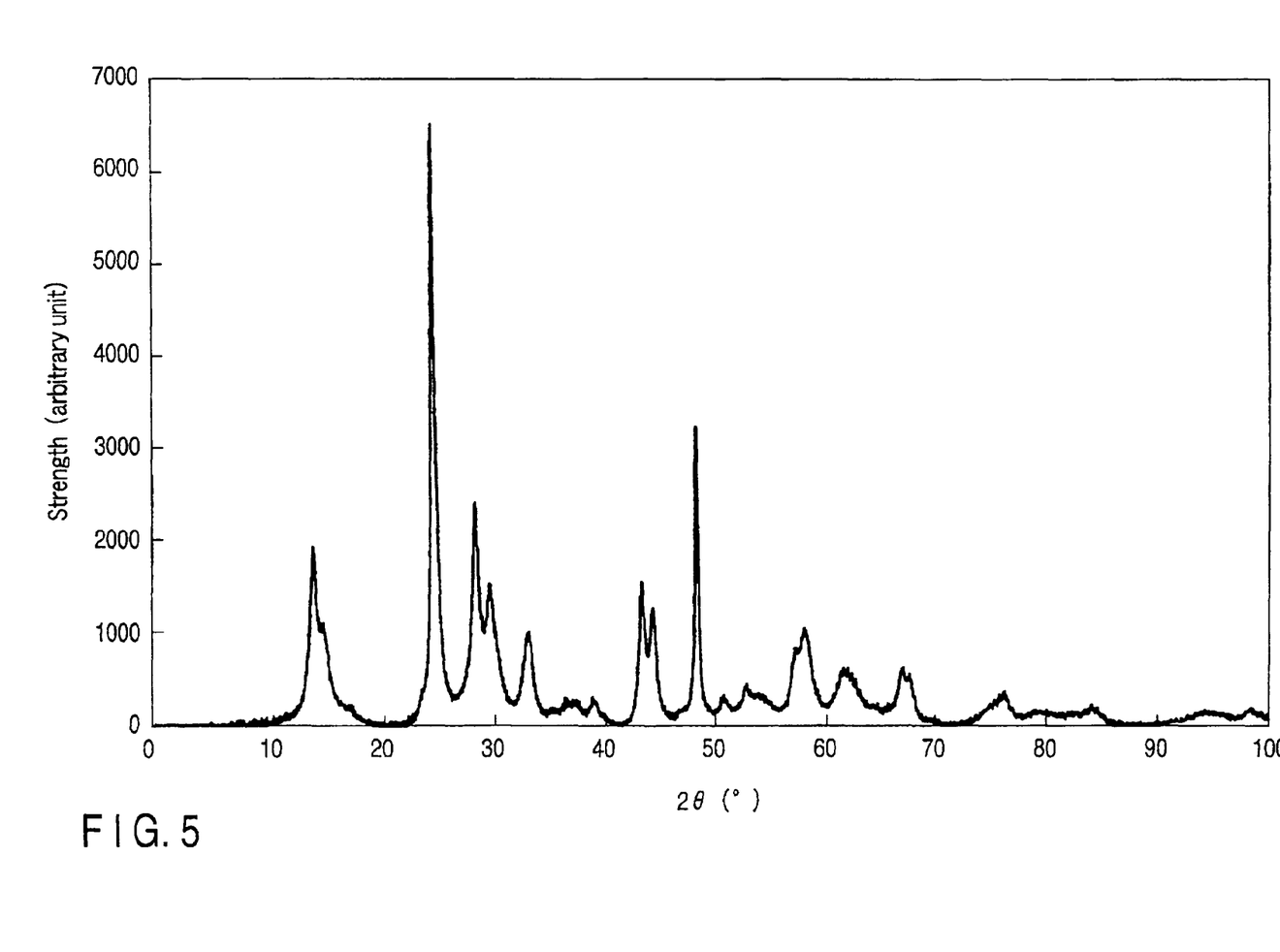
FIG. 5 is a diagram showing an X-ray diffraction pattern of titanium composite oxide of Example 1.

An X-ray diffraction of the obtained titanium composite oxide was conducted under the conditions described below. As a result, the X-ray diffraction pattern shown in FIG. 5 was obtained, and it was thus confirmed that a main substance forming the titanium composite oxide is monoclinic β-type titanium composite oxide belonging to JCPDS: 46-1237.

<Measurement Method>

A standard glass holder having a diameter of 25 mm was filled with a sample, and a measurement was conducted by employing wide angle X-ray diffractometry. A measurement apparatus and conditions are described below.

(1) X-ray diffraction apparatus: D8 ADVANCE (tube type) manufactured by Bruker AXS.
X-ray source: CuKα radiation (using Ni filter)
Output: 40 kV, 40 mA
Slit system: Div. Slit; 0.3°
Detector: LynxEye (high speed detector)
(2) Scanning method: 2θ/θ continuous scanning
(3) Measurement range (2θ): 5 to 100°
(4) Step width (2θ): 0.01712°
(5) Counting time: 1 s/step An Nb concentration of the obtained titanium composite oxide was measured by employing ICP emission spectroscopy. As a result, it was confirmed that the Nb concentration was 0.11 wt %.

<Manufacture of Negative Electrode>

A slurry was prepared by adding 90 wt % of the obtained titanium composite oxide powder, 5 wt % of a black lead powder having an average particle diameter of 3.4 μm, and 5 wt % of polyvinylidene fluoride (PVdF) to N-methylpyrrolidone (NMP) and mixing. The slurry was applied on both surfaces of a current collector made from an aluminum foil having a thickness of 15 μm, followed by drying. After that, a negative electrode having an electrode density of 2.0 g/cm$^3$ was manufactured by pressing.

<Manufacture of Electrode Group>

The positive electrode, a separator made from a porous film of polyethylene having a thickness of 25 μm, the negative electrode, and the separator were laminated in this order and spirally wound, followed by heat-pressing at 90° C., thereby obtaining a flat, spiral electrode group having a width of 30 mm and a thickness of 1.8 mm. The obtained electrode group was housed in an outer case made from a laminated film, followed by vacuum drying at 80° C. for 24 hours. The laminated film had a structure that a polypropylene layer is formed on both surfaces of an aluminum foil having a thickness of 40 μm, and a thickness of the laminated film was 0.1 mm.

<Preparation of Liquid Non-Aqueous Electrolyte>

Ethylene carbonate (EC) and ethylmethyl carbonate (EMC) were mixed at a volumetric ratio of 1:2 to obtain a mixture solvent. LiPF$_6$ which was an electrolyte was dissolved at a concentration of 1M into the mixture solvent to prepare a liquid non-aqueous electrolyte.

<Production of Non-Aqueous Electrolyte Secondary Battery>

The liquid non-aqueous electrolyte battery was injected into the outer case housing the electrode group. After that, the outer case was completely sealed by heat-sealing to obtain a non-aqueous electrolyte secondary battery having the above-described structure shown in FIG. 1 as well as a width of 35 mm, a thickness of 2 mm, and a height of 65 mm.

Examples 2 to 13

Comparative Examples 1 and 2)

14 types of non-aqueous electrolyte secondary batteries were produced in the same manner as in Example 1 except for using as the negative electrode active material titanium composite oxides each comprising monoclinic β-type titanium composite oxide containing at least one element selected from Nb, V, Ta, Al, Ga, and In, the at least one element being contained in an amount shown in Table 1.

A resistance of each of the obtained secondary batteries of Examples 1 to 13 and Comparative Examples 1 and 2 was measured, and then a charge-discharge cycle test of repeating charge-discharge of 1 C charge/1 C discharge was conducted. The resistance measurement was performed at an alternating current impedance of 1 kHz.

The resistance of each of the secondary batteries is shown in Table 1 as a ratio to Comparative Example 1 that is a criterion. Further, a ratio of 100th discharge capacity to an initial discharge capacity, i.e., a discharge retention rate (%) is shown in Table 1. As the resistance, the alternating current impedance at 1 kHz was measured.

TABLE 1

| | Contained element | Content of element [wt %] | Resistance [ratio] | Capacity retention rate [%] |
|---|---|---|---|---|
| Example 1 | Nb | 0.11 | 0.88 | 96 |
| Comparative Example 1 | — | — | 1.00 | 62 |
| Example 2 | Nb | 0.03 | 0.92 | 94 |
| Example 3 | Nb | 0.32 | 0.85 | 96 |
| Example 4 | Nb | 1.01 | 0.85 | 95 |
| Example 5 | Nb | 1.99 | 0.88 | 90 |
| Example 6 | Nb | 2.98 | 0.90 | 88 |
| Comparative Example 2 | Nb | 5.01 | 1.20 | 25 |
| Example 7 | V | 0.11 | 0.90 | 92 |
| Example 8 | Ta | 0.12 | 0.90 | 91 |
| Example 9 | Al | 0.11 | 0.91 | 93 |
| Example 10 | Ga | 0.09 | 0.92 | 90 |
| Example 11 | In | 0.09 | 0.92 | 88 |
| Example 12 | Nb/Ta | 0.31/0.12 | 0.85 | 96 |
| Example 13 | Nb/V | 0.32/0.11 | 0.85 | 96 |

As is apparent from Table 1, the secondary batteries of Examples 1 to 13 have smaller resistances as compared to Comparative Examples 1 and 2 and, therefore, have the excellent charge-discharge cycle property. Particularly, the secondary batteries of Examples 1 to 6, 12, and 13, in each of which the titanium composite oxide obtained by adding Nb to the monoclinic β-type titanium composite oxide is used as the negative electrode active material, have the more excellent charge-discharge property.

Though the embodiment of the present invention is described in the foregoing, the present invention is not limited to the embodiment and can be changed into various modes within the scope of the invention recited in claims. Further, it is possible to modify the present invention into various modes within the range which does not deviate from the scope of the invention at a practical stage. Further, it is possible to form various inventions by appropriately combining the plurality of constituent elements disclosed in the embodiment.

What is claimed is:

1. An active material for batteries comprising monoclinic β-type titanium composite oxide containing at least one element selected from the group consisting of V, Nb, Ta, Al, Ga, and In, wherein the monoclinic β-type titanium composite oxide has a space group C2/m crystal structure and has a specific surface area of 5 m$^2$/g or more and 50 m$^2$/g or less, and wherein the at least one element is present in the monoclinic β-type titanium composite oxide in an amount of 0.03 wt % or more and 3 wt % or less.

2. The active material of claim 1, wherein the at least one element occupies a Ti site of the titanium composite oxide.

3. A non-aqueous electrolyte battery comprising:
an outer case;
a positive electrode housed in the outer case;
a negative electrode housed in the outer case which is spatially separated from the positive electrode and comprises an active material; and
a non-aqueous electrolyte contained in the outer case, wherein the active material of the negative electrode comprises monoclinic β-type titanium composite oxide containing at least one element selected from the group consisting of V, Nb, Ta, Al, Ga, and In, wherein the monoclinic β-type titanium composite oxide has a space group C2/m crystal structure and has a specific surface area of 5 m$^2$/g or more and 50 m$^2$/g or less, and wherein the at least one element is present in the monoclinic β-type titanium composite oxide in an amount of 0.03 wt % or more and 3 wt % or less.

4. The battery of claim 3, wherein the at least one element is Nb alone or a mixture of Nb and V, Nb and Ta, or Nb, V, and Ta.

5. The battery of claim 3, wherein the at least one element occupies a Ti site of the monoclinic β-type titanium composite oxide.

6. The battery of claim 3, wherein the positive electrode comprises lithium nickel composite oxide or lithium manganese composite oxide.

7. The battery of claim 3, wherein the outer case is formed of a laminated film.

8. The battery of claim 3, which is for in-vehicle use.

9. A battery pack comprising a plurality of the non-aqueous electrolyte batteries defined in claim 3, in which the batteries are connected to each other in series, in parallel, or in series and in parallel.

10. The battery pack of claim 9, further comprising a protection circuit capable of detecting a voltage of each of the non-aqueous electrolyte batteries.

11. The battery of claim 3, wherein the positive electrode comprises an active material selected from the group consisting of a lithium manganese composite oxide, a lithium nickel composite oxide, a lithium cobalt composite oxide, a lithium nickel cobalt composite oxide, a lithium manganese cobalt composite oxide, a spinel type lithium manganese nickel composite oxide, a lithium phosphor oxide having an olipine structure, an iron sulfate, and a vanadium oxide.

* * * * *